C. BEVILL.
INCUBATOR.
APPLICATION FILED SEPT. 23, 1910.
1,085,527.
Patented Jan. 27, 1914.
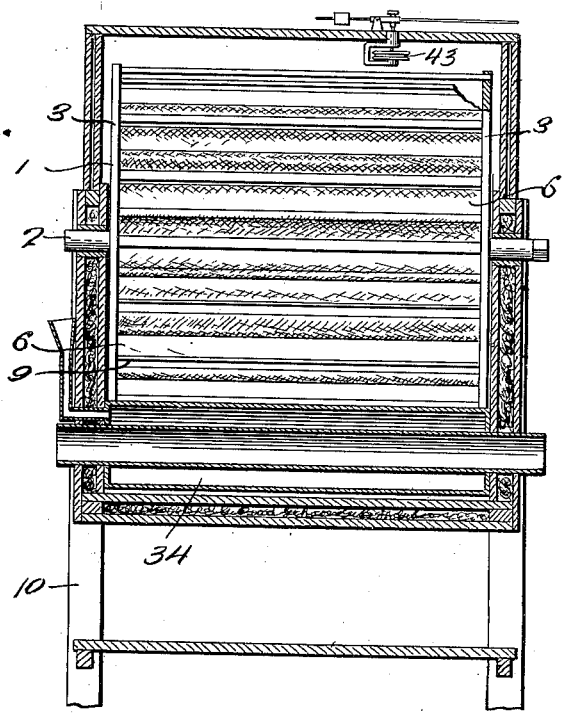
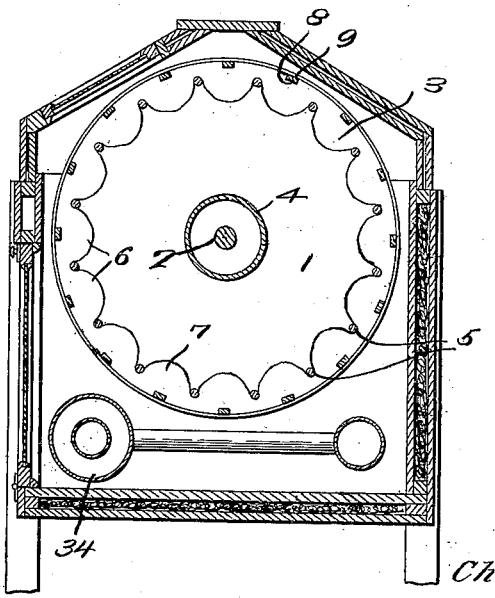
Witnesses
F. C. Gibson.
James A. Kaell
Inventor
Cheves Bevill.
By Victor J. Evans
Attorney
COLUMBIA PLANOGRAPH CO., WASHINGTON, D. C.

UNITED STATES PATENT OFFICE.

CHEVES BEVILL, OF WALDRON, ARKANSAS.

INCUBATOR.

1,085,527.　　　　Specification of Letters Patent.　　Patented Jan. 27, 1914.

Application filed September 23, 1910. Serial No. 583,479.

*To all whom it may concern:*

Be it known that I, CHEVES BEVILL, a citizen of the United States, residing at Waldron, in the county of Scott and State of Arkansas, have invented new and useful Improvements in Incubators, of which the following is a specification.

The invention relates to an egg holding apparatus for incubators and has for an object to provide an improved and efficient means for supporting the eggs to be hatched within a plurality of channels formed on the periphery of a cylinder mounted for rotation within the incubator whereby the eggs may be moved from one position to another within the incubator from the outside thereof thereby eliminating the necessity of subjecting the interior of the incubator to a change of temperature by opening same to perform the same operation.

A further object is to provide a novel means for retaining the eggs securely within the channels of the cylinder, but at the same time to permit the entire surfaces of the eggs to be exposed to the action of the heat.

With these and other objects in view, the invention consists in the construction, combination and arrangement of parts, as will hereinafter more fully be described, claimed and illustrated in the accompanying drawings, in which drawings, similar reference characters indicate corresponding parts of the several views.

In the accompanying drawings:—Figure 1 is a vertical longitudinal sectional view through an incubator constructed in accordance with the invention. Fig. 2 is a vertical transverse section thereof.

Referring to the accompanying drawing, the cylinder 1 is supported upon the shaft 2, journaled in the opposite side walls of an incubator of suitable construction, and comprises circular shaped end heads 3 connected together by means of a cylindrical drum or core 4, in any suitable manner. Extending from one head 3 to the other near the peripheries thereof are spaced tie rods 5, over which is trained a flexible sheet or covering 6, the latter, between the rods being dished or concaved to provide channels or pockets 7, the same extending longitudinally of the cylinder, the said sheet or covering being secured to said rods in any desirable manner and is formed preferably from fabric material. The pockets or channels, thus formed, are adapted to receive the eggs from which are to be hatched chicks. At the periphery of the heads 3 are provided the openings 8, at points midway between and beyond and above the tie rods 5, for the purpose of permitting the insertion of the retaining rods 9. The rods serve to retain the eggs within the pockets or channels 7 when the cylinder is being rotated within the casing. The incubator is further provided with a heater 34 and a thermostat 43 of any desired pattern.

From the foregoing it will be seen that I have provided an egg-holding apparatus of a simple and efficient structure wherein the eggs may be quickly inserted within the pockets or channels and a securing means whereby the eggs are securely retained against displacement within the channels and at the same time permit their exposure directly to the action of the heat regardless of the position of the cylinder.

Having thus described the invention what I claim as new is:—

In an incubator an egg holder rotatably mounted and comprising spaced heads, rods connecting the heads together and located at equal distances apart and at equal distances from the centers of the heads, a fabric material trained around and secured to the rods and adapted to bow inwardly between the same, each inwardly bowed portion of the fabric adapted to receive a single row of eggs, and egg retaining rods connected with the peripheral portions of the heads and located beyond the first mentioned rods and midway between the adjacent rods of the first mentioned set.

In testimony whereof I affix my signature in presence of two witnesses.

CHEVES BEVILL.

Witnesses:
　G. Cox,
　JOHN M. MARTIN.

---

Copies of this patent may be obtained for five cents each, by addressing the "Commissioner of Patents, Washington, D. C."